United States Patent [19]

Komori

[11] Patent Number: 4,494,917

[45] Date of Patent: Jan. 22, 1985

[54] BEARING STRUCTURE FOR AN AIR COMPRESSOR

[75] Inventor: Haruyuki Komori, Narashino, Japan

[73] Assignee: Seiko Seiki Kabushiki Kaisha, Chiba, Japan

[21] Appl. No.: 520,857

[22] Filed: Aug. 5, 1983

Related U.S. Application Data

[63] Continuation-in-part of Ser. No. 294,995, Aug. 21, 1981, abandoned.

[30] Foreign Application Priority Data

Sep. 12, 1980 [JP] Japan ................... 55-126981

[51] Int. Cl.$^3$ ............................................ F01C 21/02
[52] U.S. Cl. ........................................ 418/69; 418/270
[58] Field of Search ...................... 418/259, 266–270, 418/133, 69; 384/271, 272, 278

[56] References Cited

U.S. PATENT DOCUMENTS

| | | | |
|---|---|---|---|
| 3,075,503 | 1/1963 | Kimsey | 418/69 |
| 3,223,044 | 12/1965 | Adams | 418/267 |
| 3,240,158 | 3/1966 | Brundage | 418/133 |
| 3,279,325 | 10/1966 | Graubins | 418/266 |
| 3,834,846 | 9/1974 | Linder | 418/133 |

Primary Examiner—John J. Vrablik
Assistant Examiner—Jane E. Obee
Attorney, Agent, or Firm—Robert E. Burns; Emmanuel J. Lobato; Bruce L. Adams

[57] ABSTRACT

A compressor rotary mounting shaft for rotatably mounting a compressor rotor is supported by a bearing surface defined by a bearing surface hole through a compressor cylinder block. A portion of the rotary mounting shaft is tapered, and the tapered portion of the rotary mounting shaft confronts a portion of the bearing surface which is cooled by refrigerant gas and which is cooled by refrigerant gas and which contracts during operating of the compressor. The tapered portion of the rotary mounting shaft ensures that sufficient clearance remains between the rotary mounting shaft and the portion of the bearing surface hole that contracts during compressor operation so as to allow the formation of a lubricating oil film to prevent shaft locking due to thermal contraction of the bearing surface hole or eccentric driving of the rotary mounting shaft.

7 Claims, 3 Drawing Figures

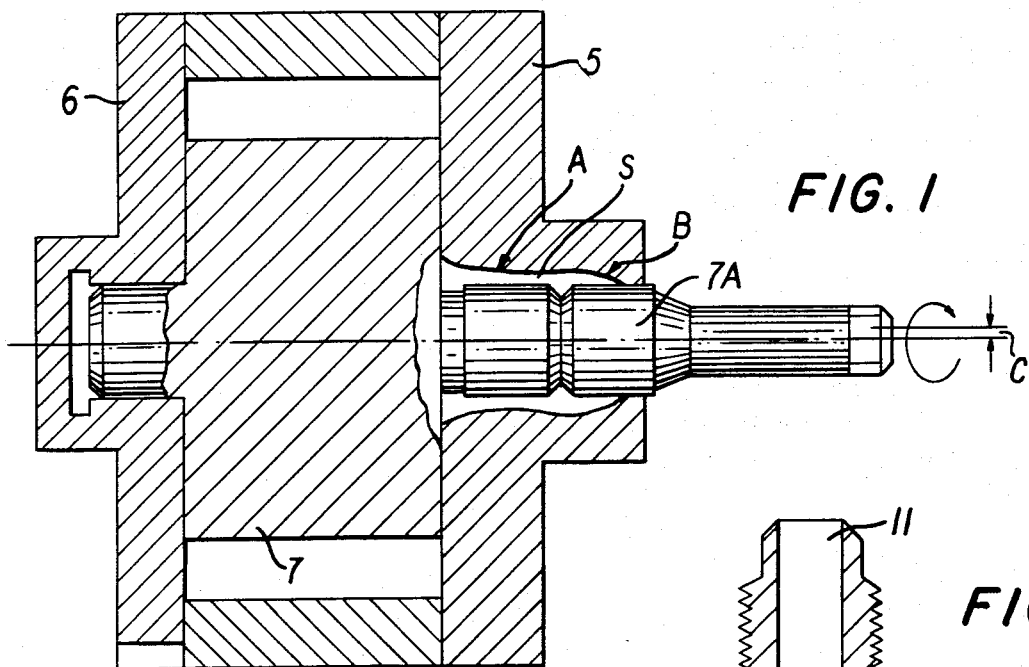
FIG. 1
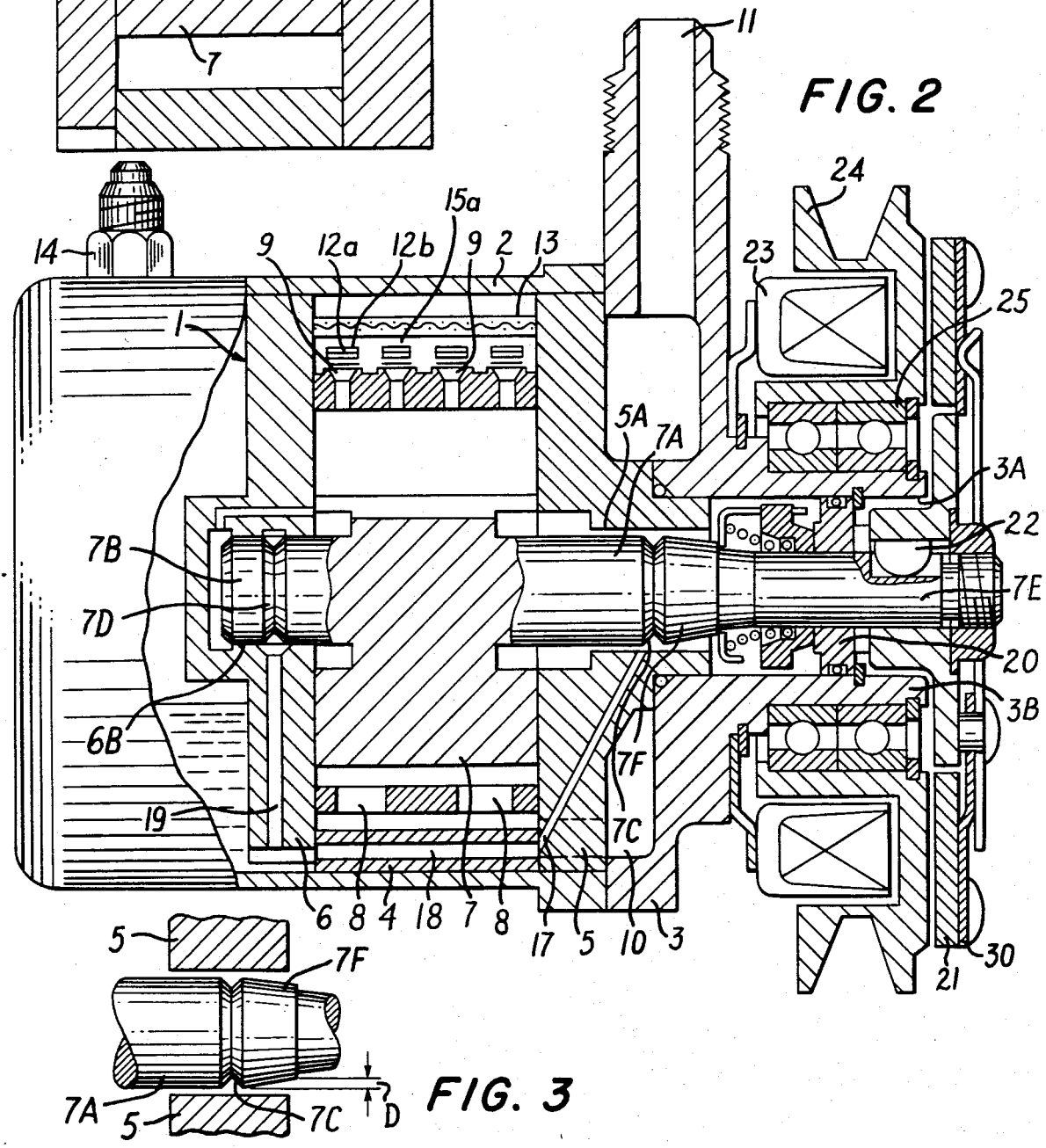
FIG. 2
FIG. 3

BEARING STRUCTURE FOR AN AIR COMPRESSOR

RELATED APPLICATION

This is a continuation-in-part of application Ser. No. 294,995 filed Aug. 21, 1981 and now abandoned.

BACKGROUND OF THE INVENTION

The present invention relates to an air compressor, and more particularly to the bearing structure of the air compressor in which a rotary shaft extending from both sides of a compressor rotor is supported by bearings provided on a front side and a rear side of the compressor.

Generally, in a rotary compressor, i.e. in a compressor in which the volume of the internal cylinder is changed by a rotor, a rotor having slidable vanes is rotatably housed in a cylinder chamber comprised of a cylinder, a front block and a rear block attached to both ends of the cylinder, and the cylinder chamber is divided into a plurality of smaller chambers by the rotor vanes. The desired compression is carried out in the cylinder chamber by rotating the rotor at the desired speed of rotation.

A dynamic pressure bearing has already been developed for use as the bearing for rotatably supporting the rotary shaft extending from both sides of the rotor. When a refrigerant gas absorbed from an absorbing port at a low temperature and a low pressure is passed through the passage of the front block, the temperature of the bearing portion of the rotor becomes low, but the refrigerant gas once compressed has a high temperature and a high pressure, and the cylinder chamber is at a high temperature.

As a consequence, the temperature of the bearing portion of the front block near an inlet becomes low and the front block bearing portion shrinks because of thermal contraction, while the bearing portion near the cylinder chamber is at a high temperature and expands because of thermal expansion. Therefore, the clearance becomes larger than the normal slit S at the bearing portion A and the clearance becomes smaller than the normal slit S at the bearing portion B as shown in FIG. 1. As a result the problem of locking often occurs between a rotary shaft 7A of the rotor and the bearing portion near the inlet. Furthermore, when the electromagnetic clutch for transmitting rotation from an engine to the compressor shaft by way of a pulley is attached to the compressor body, if the center of the electromagnetic clutch shifts from the center of the rotary shaft by a distance C, the rotary shaft whirls with an eccentric motion relative to the center of the electromagnetic clutch, whereby the problem of locking between the rotary shaft and the bearing portion occurs.

SUMMARY OF THE INVENTION

It is therefore an object of the present invention to provide bearing structure in a compressor which prevents rotary mounting shaft locking at the operating temperatures of the compressor.

Another object of the invention is to provide bearing structure in a compressor which prevents rotary mounting shaft locking when the rotary mounting shaft is driven eccentrically.

According to the invention, a compressor rotary mounting shaft for rotatably mounting a compressor rotor is supported by a bearing surface defined by a bearing surface hole through a compressor cylinder block. A portion of the rotary mounting shaft is tapered, and the tapered portion of the rotary mounting shaft confronts a portion of the bearing surface which is cooled by refrigerant gas and which contracts during operation of the compressor. The tapered portion of the rotary mounting shaft ensures that sufficient clearance remains between the rotary mounting shaft and the portion of the bearing surface hole that contracts during compressor operation so as to allow the formation of a lubricating oil film to prevent shaft locking due to thermal contraction of the bearing surface hole or eccentric driving of the rotary mounting shaft.

BRIEF DESCRIPTION OF THE DRAWINGS

FIG. 1 is an explanatory diagram for illustrating the structure of a conventional air compressor and the disadvantages thereof;

FIG. 2 is a partial cutaway elevation in section of a bearing portion of an air compressor according to the present invention; and FIG. 3 illustrates the bearing structure shown in FIG. 2.

DETAILED DESCRITPION OF THE INVENTION

FIG. 2 is a partial cutaway elevation in section showing the essential structure of the bearing structure according to the present invention incorporated in an air compressor for a car cooler. The air compressor comprises a compressor body 1, a casing 2, one end of which is opened, enclosing the compressor body 1 and a front head 3 attached to the opening of the casing 2. The compressor body 1 comprises a cylinder 4 the inner periphery of which is cylindrical, a front block 5 and a rear block 6 attached to respective opposite sides of the cylinder 4, by which the cylindrical cylinder chamber is formed. A rotor 7 of full cylindrical shape is rotatably arranged in the cylinder chamber. The rotor 7 is provided with vanes, not shown, slidably to divide the cylinder chamber into a plurality of smaller chambers, and the compression is achieved by rotating the rotor 7.

At the peripheral wall of the cylinder 4 comprising the compressor body 1, there are provided inlet ports 8, 8 and outlet ports 9, 9. The inlet ports 8, 8 communicate with an inlet 11 via an annular inlet recess 10 of the front head 3, and the outlet ports 9, 9 are provided with valve mechanisms 12 comprised of an outlet valve 12a and a valve support 12b. The outlet valve 12a is opened by rotation of the rotor 7 to discharge from the cylinder chamber a refrigerant gas compressed to a high pressure. The oil in the refrigerant gas is separated when it passes through a gas permeable member attached to cover the lead valve 15a, for example, an oil separator 13 made of multilayered wire gauge immediately after it is discharged. The refrigerant gas in which the oil is separated is once fed to a high pressure chamber inside the casing 2 and then discharged from an outlet 14 against a condensor (not shown). The oil separated from the refrigerant gas is fed back to the lubrication oil stored in the casing to be used again.

The rotary shaft 7A extending from the center of the rotor 7 passes through a bearing hole 5A of the front block 5 and is supported by the inner surface of the bearing hole 5A, and a rotary shaft 7B extends in a direction opposite that of the rotary shaft 7A and passes through a bearing hole 6B of the rear block and is supported by the inner surface of the bearing hole 6B. Oil recesses 7C and 7D are provided at substantially a center portion in the lengthwise direction of the rotary shafts 7A and 7B. The lubrication oil stored in the bottom portion of the casing 2 is introduced to the oil recess 7C by a communication hole 17 which passes through the front block 5 and is delivered to the oil recess 7C, and a communication passage 18 which passes through the peripheral wall portion of the cylinder 4 in the lengthwise direction. The lubrication oil is introduced to the oil recess 7D via a communication passage 19 which passes through the rear block 6 in the radial direction thereof. The bearing portions of the bearing holes 5A, 6B and the rotary shafts 7A, 7B are lubricated by the lubrication oil flowing through the oil recesses 7C and 7D, whereby the rotary shaft is smoothly rotated by the dynamic pressure effect.

A rotary shaft 7E extending further outwardly from an end of the rotary shaft 7A is sealed by a seal member 20 to seal the portion where the refrigerant gas escapes from the air in the air compressor and is positioned substantially centered in a through hole 3A of the front head 3. Further, rotation of a movable clutch plate 21 of an electromagnetic clutch is stopped by a key 22 inserted into a keyway. When the movable plate 21 is attracted by the electromagnetic force of the electromagnetic coil 23, it shifts in the axial direction against the face of a spring member 30. A pulley member 24 constantly rotated by driving means such as a belt and the like, not shown, is rotatably supported by a cylindrical extension 3B of the front head 3 by way of a bearing member 25. The electromagnetic coil 23 attracts the electromagnetic clutch movable member 21 by the electromagnetic attractive force generated by exciting the electromagnetic coil 23 so that the pulley 24 and the clutch plate 21 engage each other. Accordingly, the rotation of the pulley 24 is transmitted to the rotary shaft 7E to rotate the rotor 7.

The bearing structure of the present invention will now be discussed in detail.

The bearing hole surface 5A has a substantially constant diameter and is dimensioned to receive and rotatably support the rotor mounting shaft 7A. The circumferential surface oil groove 7C of the mounting shaft 7A is within the bearing hole and opposite the bearing hole surface 5A. The mounting shaft 7A has a substantially constant diameter portion extending the length of the bearing hole surface 5A up to the oil groove 7C, and a tapered portion 7F starting adjacent the oil groove 7C and converging in a direction away from the oil groove 7C and away from the rotor 7. The tapered portion 7F of the mounting shaft 7A extends for substantially the length of the bearing hole surface 5A beyond the oil groove 7C.

The side of the bearing surface hole 5A away from the rotor 7 (the right side in FIG. 2) normally is at a low temperature during operation of the compressor because of the low pressure low temperature refrigerant gas which flows through the gas inlet 11. As a consequence, the size of the portion of the bearing surface hole 5A remote from the rotor 7 and confronting the tapered portion 7F of the mounting shaft 7A shrinks due to thermal contraction. However, proper clearance between the bearing surface defined by the hole 5A and the mounting shaft 7A is maintained in the region of thermal contraction of the hole because of the progressively decreasing diameter of the tapered section 7F of the mounting shaft 7A. As shown in FIG. 3, the radius of the maximum diameter of the tapered section and the radius of the minimum diameter of the tapered section 7F differ by a value D which typically is several microns to about ten microns, so that the difference between the maximum and minimum diameters of the tapered section 7F typically is several microns to about 20 microns. The tapered section 7F is illustrated having a straight taper, however, other taper profiles are within the scope of the present invention.

The refrigerant gas flowing through the inlet ports 8, 8 into the cylinder 4 greatly increases in pressure and temperature after being compressed by rotation of the rotor 7. The high temperature of the compressed gas causes the side of the bearing surface hole 5A closest to the rotor 7 (the left side in FIG. 2) to expand due to thermal expansion. The bearing surface hole 5A and the constant diameter portion of the mounting shaft 7A are dimensioned to allow formation of a lubricating oil film on the mounting shaft 7A and bearing surface, and the tapered portion 7F of the mounting shaft maintains sufficient clearance to allow formation of a lubricating oil film even when the portion of the bearing surface hole 5A shrinks due to thermal contraction. Consequently, the problem of locking between the rotary mounting shaft 7A and the bearing surface hole 5A does not occur.

The center of the rotary shaft 7E is not always coincident with the center of the driving device for transmitting the rotating force since it depends on the position where it is mounted. If the rotary shaft 7E is mounted on the rotating force driving device eccentrically, it is driven eccentrically, and the rotary shaft whirls from the shaft center to some extent. If the space between the rotary shaft 7A and the bearing hole 5A is not sufficient, the problem of locking therebetween occurs, and rotation of the shaft stops. However, even if the rotary shaft is mounted eccentrically and whirls, the problem of shaft locking is prevented if the tapered portion 7F is provided as illustrated above.

As clearly understood from the above description, in the air compressor and bearing structure of the present invention, the tapered surface to increase the clearance outwardly is provided on the rotary mounting shaft. Consequently, the shrinkage of the bearing surface hole caused by the difference in the temperature of the refrigerant gas before and after the compression is compensated, the locking problem at the bearing portion of the mounting shaft caused by whirling of the rotary mounting shaft when the electromagnetic clutch is eccentrically mounted and stoppage of the shaft rotation are prevented, and the compressor can be stably rotated.

I claim:

1. In a gas compressor, the combination comprising:
a cylinder having an end block;
a compressor rotor within said cylinder and having an axial mounting shaft extending therefrom toward said end block;
a bearing surface defining a substantially constant diameter opening through said end block aligned with said mounting shaft and dimensioned to receive therein said mounting shaft for rotatably supporting said mounting shaft to mount said rotor for rotation within said cylinder; and
said mounting shaft having a circumferential surface oil groove positioned within the opening through said end block and opposite said bearing surface, a substantially constant diameter portion extending the length of said bearing surface up to said oil groove and on the side of said oil groove as said rotor and a tapered portion starting adjacent said oil groove and converging in a direction away from said oil groove and away from said rotor and extending for substantially the length of said bearing surface beyond said oil groove.

2. In a gas compressor, the combination according to claim 1, wherein said tapered portion of said mounting shaft has a straight taper and the difference between the maximum and minimum diameters of said tapered portion is on the order of several microns.

3. In a gas compressor, the combination according to claim 2, wherein the difference between the maximum and minimum diameters of said tapered portion is less than twenty microns.

4. A gas compressor, comprising:
   a hollow cylinder having front and rear open ends;
   a compressor rotor disposed within said cylinder and having a pair of axially aligned mounting shafts extending from opposite ends of said compressor rotor for mounting said compressor rotor for rotation;
   front and rear cylinder blocks mounted for closing said front and rear ends of said cylinder and each having a respective hole therethrough dimensioned for receiving a respective one of said pair of axially aligned mounting shafts and defining a bearing surface for rotatably supporting said pair of axially aligned mounting shafts;
   said mounting shaft extending through said front cylinder block having a circumferential surface oil groove positioned opposite the bearing surface defined by the hole through said front cylinder block;
   a magnetic clutch element movably mounted on said mounting shaft extending through said front cylinder block;
   a front cylinder head mounted on said front cylinder block and having a bearing support adjacent said front cylinder block;
   means comprised of an electromagnet energizable for attracting said magnetic clutch element toward said bearing support; and
   said mounting shaft extending through said front cylinder block having a tapered portion starting adjacent said oil groove and converging in a direction away from said oil groove and toward said bearing support.

5. A gas compressor according to claim 4, wherein the hole through said front cylinder block has a substantially constant diameter, and said mounting shaft extending through said front cylinder block has a substantially constant diameter portion extending the length of said hole up to said oil groove.

6. A gas compressor according to claim 5, wherein said tapered portion of said mounting shaft extending through said front cylinder block has a straight taper and the difference between the maximum and minimum diameters of said tapered portion is on the order of several microns.

7. A gas compressor according to claim 6, wherein the difference between the maximum and minimum diameters of said tapered portion is less than twenty microns.

* * * * *